United States Patent
Park et al.

(10) Patent No.: US 9,883,535 B2
(45) Date of Patent: Jan. 30, 2018

(54) CHANNEL ACCESS METHOD AND APPARATUS THEREFOR

(71) Applicant: LG ELECTRONICS INC., Seoul (KR)

(72) Inventors: Giwon Park, Seoul (KR); Kiseon Ryu, Seoul (KR); Hangyu Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 179 days.

(21) Appl. No.: 14/890,142

(22) PCT Filed: May 12, 2014

(86) PCT No.: PCT/KR2014/004227
§ 371 (c)(1),
(2) Date: Nov. 9, 2015

(87) PCT Pub. No.: WO2014/185675
PCT Pub. Date: Nov. 20, 2014

(65) Prior Publication Data
US 2016/0128101 A1 May 5, 2016

Related U.S. Application Data

(60) Provisional application No. 61/822,889, filed on May 13, 2013, provisional application No. 61/825,494, filed on May 20, 2013.

(51) Int. Cl.
*H04W 74/08* (2009.01)
*H04W 72/10* (2009.01)
*H04W 84/12* (2009.01)

(52) U.S. Cl.
CPC ....... *H04W 74/0833* (2013.01); *H04W 72/10* (2013.01); *H04W 74/085* (2013.01); *H04W 84/12* (2013.01)

(58) Field of Classification Search
CPC ................................................ H04W 74/0833
See application file for complete search history.

(56) References Cited

U.S. PATENT DOCUMENTS

2013/0155933 A1\* 6/2013 Kneckt ............... H04W 74/002
370/312
2013/0231151 A1\* 9/2013 Kneckt ............... H04W 40/246
455/515

(Continued)

FOREIGN PATENT DOCUMENTS

KR 10-1094994 12/2011
KR 10-1149147 6/2012

(Continued)

OTHER PUBLICATIONS

PCT International Application No. PCT/KR2014/004227, Written Opinion of the International Searching Authority dated Aug. 19, 2014, 1 page.

*Primary Examiner* — Jason Mattis
(74) *Attorney, Agent, or Firm* — Lee Hong Degerman Kang Waimey

(57) ABSTRACT

Disclosed are a channel access method and an apparatus therefor. A channel access method in a wireless LAN includes the steps of determining whether an STA (station) changes a first access category for a probe request frame; and if a first access category is changed to a second access category, performing a back-off process for enabling the STA to transmit the probe request frame based on the second access category, wherein the second access category may have a lower priority than the first access category.

8 Claims, 17 Drawing Sheets

(56) References Cited

U.S. PATENT DOCUMENTS

2013/0294354 A1* 11/2013 Zhang .................. H04W 72/04
                                                        370/329
2015/0098459 A1*  4/2015 Lee ....................... H04W 48/16
                                                        370/338

FOREIGN PATENT DOCUMENTS

| KR | 10-2012-0135247 | 12/2012 |
| KR | 10-2013-0006647 | 1/2013 |
| KR | 10-1230291 | 2/2013 |
| WO | 2008/008990 | 1/2008 |
| WO | 2011/100467 | 8/2011 |

* cited by examiner

FIG. 1
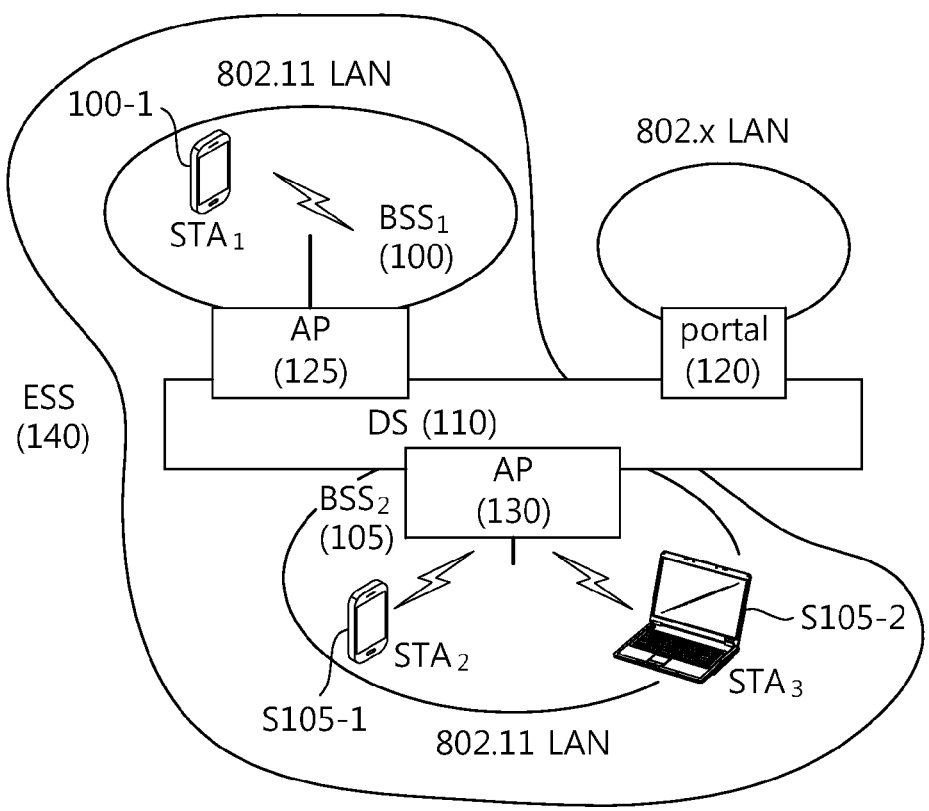
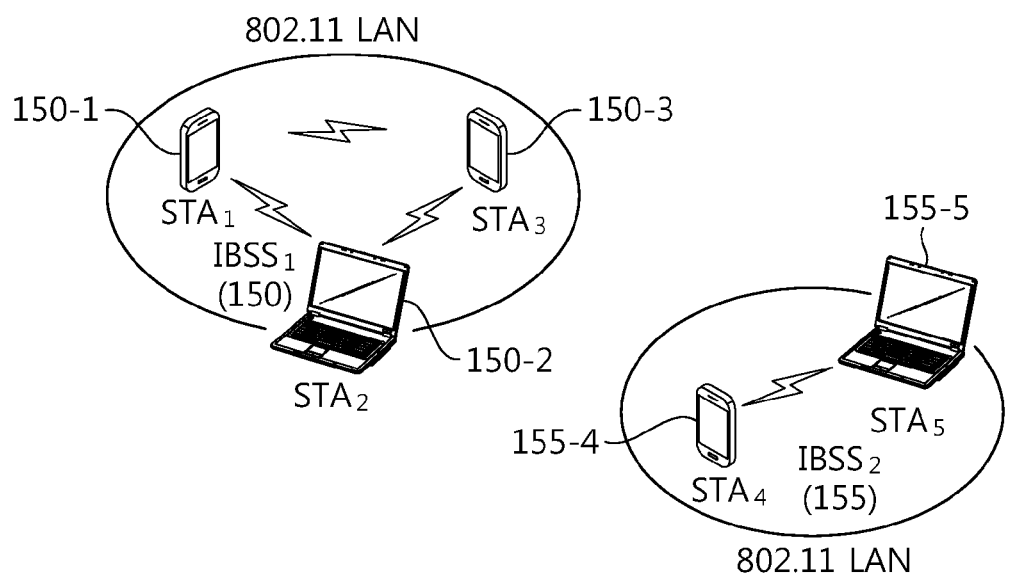

FIG. 6
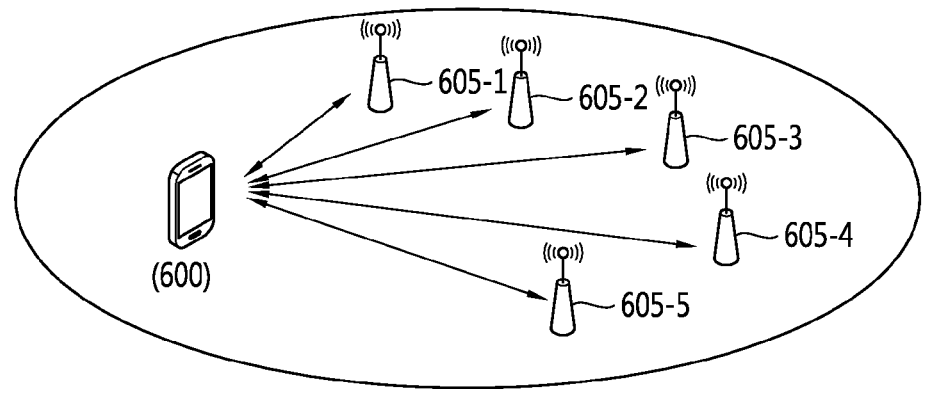
probe request frame (610)
(wildcard, SSID, wildcard BSSID)
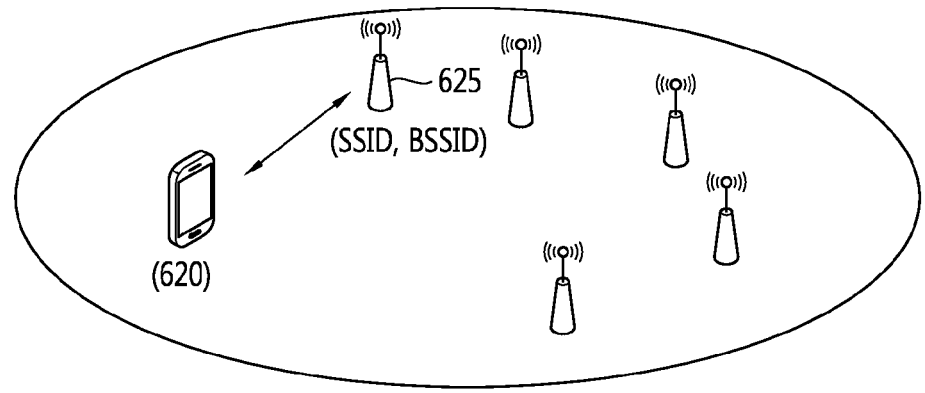
probe request frame (630)
(SSID, BSSID)
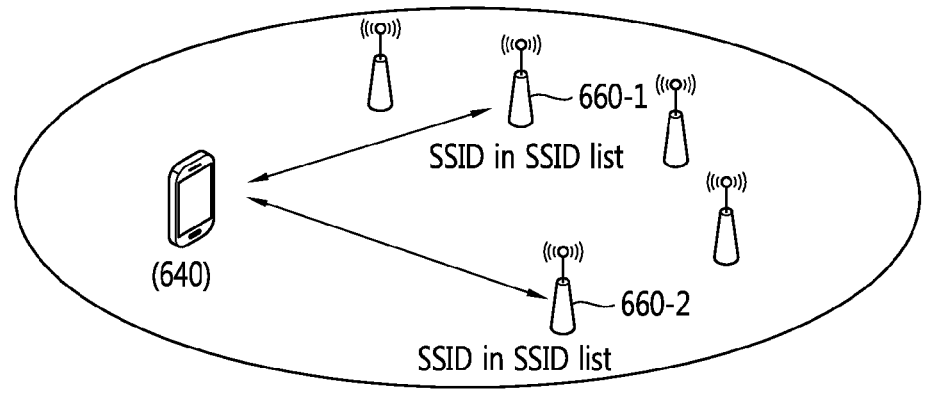
probe request frame (660)
(SSID, wildcard BSSID)

FIG. 15
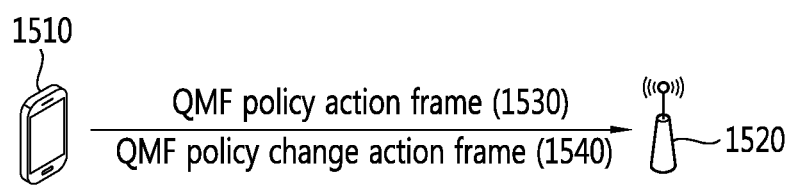
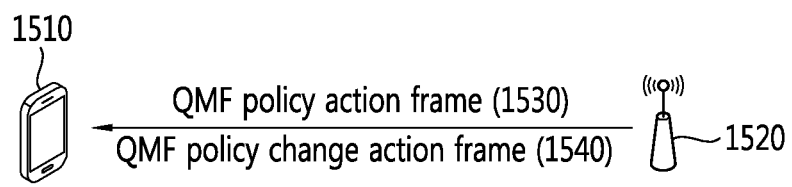

CHANNEL ACCESS METHOD AND APPARATUS THEREFOR

CROSS-REFERENCE TO RELATED APPLICATIONS

This application is the National Stage filing under 35 U.S.C. 371 of International Application No. PCT/KR2014/004227, filed on May 12, 2014, which claims the benefit of U.S. Provisional Application No. 61/822,889, filed on May 13, 2013 and 61/825,494, filed May 20, 2013, the contents of which are all hereby incorporated by reference herein in their entirety.

BACKGROUND OF THE INVENTION

Field of the Invention

The present invention relates to wireless communications, and more particularly, to a channel access method and apparatus.

Related Art

A Wireless Next Generation Standing Committee (WNG SC) of institute of electrical and electronic engineers (IEEE) 802.11 is an AD-HOC committee that a next-generation wireless local area network (WLAN) in the medium and long term.

In an IEEE conference in March 2013, Broadcom presented the need of discussion of the next-generation WLAN after IEEE 802.11ac in the first half of 2013 when an IEEE 802.11ac standard is finished based on a WLAN standardization history. A motion for foundation of a study group which Orange and Broadcom proposed in the IEEE conference in March 2013 and most members agreed has been passed.

A scope of a high efficiency WLAN (HEW) which the next-generation WLAN study group primarily discusses the next-generation study group called the HEW includes 1) improving a 802.11 physical (PHY) layer and a medium access control (MAC) layer in bands of 2.4 GHz and 5 GHz, 2) increasing spectrum efficiency and area throughput, 3) improving performance in actual indoor and outdoor environments such as an environment in which an interference source exists, a dense heterogeneous network environment, and an environment in which a high user load exists, and the like. That is, the HEW operates at 2.4 GHz and 5 GHz similarly to the existing WLAN system. A primarily considered scenario is a dense environment in which access points (APs) and stations (STAs) are a lot and under such a situation, improvement of the spectrum efficiency and the area throughput is discussed. In particular, in addition to the indoor environment, in the outdoor environment which is not considerably considered in the existing WLAN, substantial performance improvement is concerned.

In the HEW, scenarios such as wireless office, smart home, stadium, Hotspot, and building/apartment are largely concerned and discussion about improvement of system performance in the dense environment in which the APs and the STAs are a lot is performed based on the corresponding scenarios.

In the future, in the HEW, improvement of system performance in an overlapping basic service set (OBSS) environment and improvement of outdoor environment performance, and cellular offloading are anticipated to be actively discussed rather than improvement of single link performance in one basic service set (BSS). Directionality of the HEV means that the next-generation WLAN gradually has a technical scope similar to mobile communication. When a situation is considered, in which the mobile communication and the WLAN technology haven been discussed in a small cell and a direct-to-direct (D2D) communication area in recent years, technical and business convergence of the next-generation WLAN and the mobile communication based on the HEW is predicted to be further active.

SUMMARY OF THE INVENTION

The present invention provides a method for performing a channel access.

The present invention also provides an apparatus for performing a channel access.

According to one aspect of the present invention, a channel access method in a wireless local area network (WLAN) may include: determining whether a station (STA) changes a first access category for a probe request frame; and if the first access category is changed to a second access category, performing a backoff procedure by the STA to transmit the probe request frame on the basis of the second access category, wherein the second access category has a lower priority than the first access category. The determining of whether the STA changes the first access category for the probe request frame may include, if the STA receives a probe request frame transmitted by another STA during a probe delay duration for the probe request frame before the backoff procedure, changing the first access category to the second access category. A size of a second arbitration inter-frame space (AIFS) of the second access category may be greater than a size of a first AIFS of the first access category. A size of a second contention window minimum (aCWmin) of the second access category may be greater than a size of a first aCWmin of the first access category. The channel access method in the WLAN may further include transmitting information on the second access category by the STA to an access point (AP). The determining of whether the STA changes the first access category for the probe request frame may include, if the STA receives information on the changed access category of the AP from the AP, changing the first access category to the second access category on the basis of the changed access category of the AP.

According to another aspect of the present invention, an STA for performing a channel access in a WLAN may include: a radio frequency (RF) unit for transmitting a radio signal; and a processor selectively coupled to the RF. The processor may be configured for determining whether to change a first access category for a probe request frame, and if the first access category is changed to a second access category, performing a backoff procedure to transmit the probe request frame on the basis of the second access category. The second access category may have a lower priority than the first access category. Upon receiving a probe request frame transmitted by another STA during a probe delay duration for the probe request frame before the backoff procedure, the processor may be configured to change the first access category to the second access category. A size of a second AIFS of the second access category may be greater than a size of a first AIFS of the first access category. A size of a second aCWmin of the second access category may be greater than a size of a first aCWmin of the first access category. The processor may be configured to transmit information on the second access category to an AP. Upon receiving information on the changed access category of the AP from the AP, the processor may be configured to change the first access category to the second access category on the basis of the changed access category of the AP.

Unnecessary frame transmission can be omitted by changing an access category of a frame when performing a channel access. This method may be used to reduce frame flooding and inter-frame collision in a communication environment in which many stations (STAs) are densely present.

BRIEF DESCRIPTION OF THE DRAWINGS

FIG. 1 is a concept view illustrating the structure of a wireless local area network (WLAN).

FIG. 6 is a concept view illustrating a probe request frame transmission method.

FIG. 15 shows the concept of an initial access method according to an embodiment of the present invention.

DESCRIPTION OF EXEMPLARY EMBODIMENTS

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
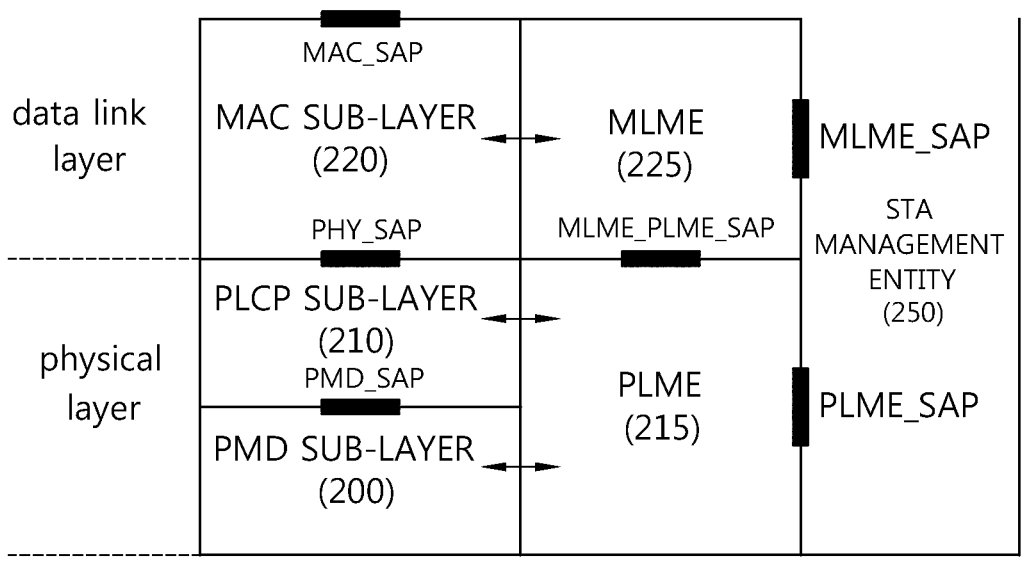
FIG. 2 is a view illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
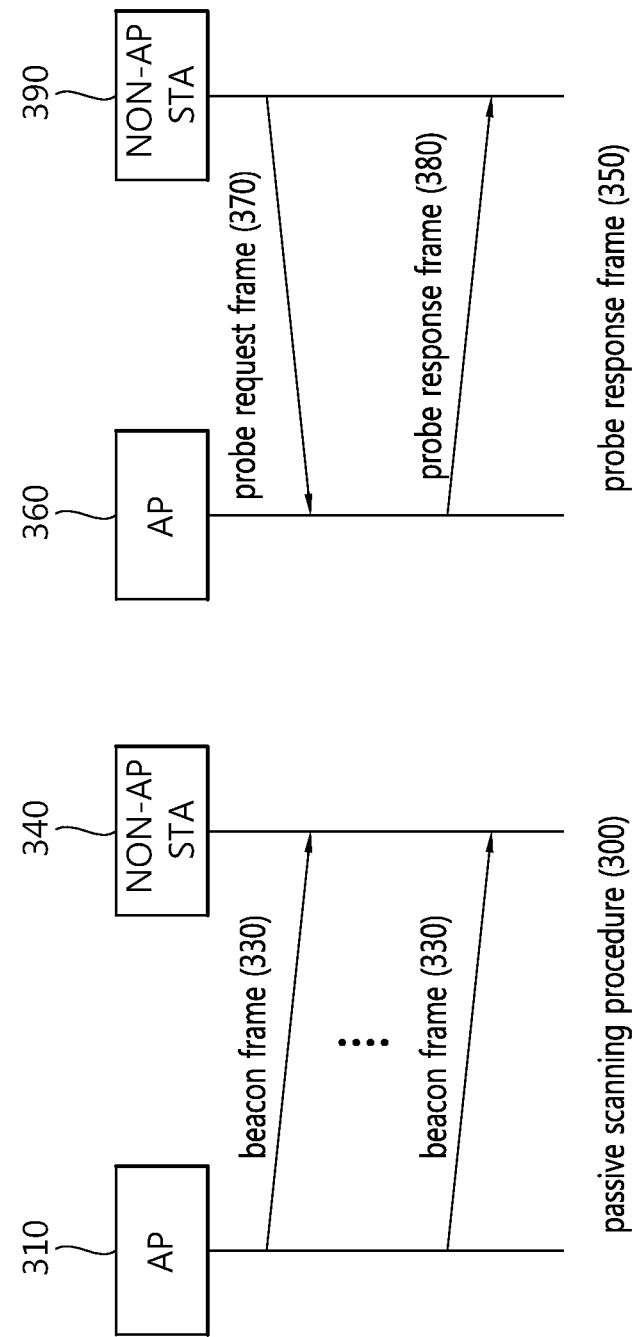
FIG. 3 is a concept view illustrating a scanning method in a WLAN.

FIG. 3 is a concept view illustrating a scanning method in a WLAN.

Referring to FIG. 3, the scanning method may be divided into passive scanning 300 and active scanning 350.

Referring to a left part of FIG. 3, the passive scanning 300 may be performed by a beacon frame 330 that is periodically broadcast from the AP 310. The AP 310 in the WLAN broadcasts the beacon frame 330 to the non-AP STA 340 at a particular period (e.g., per 100 msec). The beacon frame 330 may contain information on the current network. The non-AP STA 340 may perform scanning on the channel with the AP 310 to perform the authentication/association process by obtaining the network information from the beacon frame 330 periodically broadcast.

The passive scanning method 300 only receives the beacon frame 330 transmitted from the AP 310 without the need for the non-AP STA 340 to transmit a frame. Accordingly, the passive scanning 300 is advantageous of a reduction in the overall overhead that is created upon data transmission/reception over the network. However, since the scanning is obliged to be passively performed in proportion to the period of the beacon frame 330, the time taken to perform scanning may be increased. The details of the beacon frame are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, IEEE 802.11)' 8.3.3.2 beacon frame disclosed on November, 2011. IEEE 802.11ai may additionally use other format of a beacon frame, and such beacon frame may be referred to as a FILS (fast initial link setup) beacon frame. Further, the measurement pilot frame is a frame containing only some information of the beacon frame, and the measurement pilot frame may be used in the scanning procedure. The measurement pilot frame is set forth in IEEE 802.11 8.5.8.3 measurement pilot format.

Also, a fast initial link setup (FILS) discovery frame may be defined. The FILS discovery frame is a frame transmitted between each of the transmission periods in each AP, may be a frame transmitted with a shorter period than the beacon frame. That is, the FILS discovery frame is a frame transmitted with a shorter period than a transmission period of the beacon frame. The FILS discovery frame may include identification information (SSID, BSSID) of an AP that transmits the FILS discovery frame. It may be implemented that the FILS discovery frame is transmitted to an STA before the beacon frame is transmitted, and thus, the STA may search that an AP is existed in the corresponding channel beforehand. An interval of which the FILS discovery frame is transmitted in one AP is referred to as an FILS discovery frame transmission interval. The FILS discovery frame may be transmitted with a part of information included in the beacon frame being included. The FILS discovery frame may also include information for a transmission time of the beacon frame of neighbor AP.

Referring to a right part of FIG. 3, the active scanning 350 refers to a method in which the non-AP STA 390 leads scanning by transmitting a probe request frame 370 to the AP 360.

After receiving the probe request frame 370 from the non-AP STA 390, the AP 360 may wait a random time to prevent frame collision, and the AP 360 then includes network information in a frame response frame 380, then sending the same to the non-AP STA 390. The non-AP STA 390 may obtain the network information based on the received probe response frame 380 to stop the scanning process.

The active scanning 350 allows the non-AP STA 390 to lead the scanning process, and the active scanning 350 has the advantage of a short scanning time. However, the non-AP STA 390 should transmit the probe request frame 37, resulting in an increase in the network overhead for frame transmission and reception. The probe request frame 370 is set forth in IEEE 802.11 Ch. 8.3.3.9, and the probe response frame 380 is set forth in IEEE 802.11 Ch. 8.3.3.10.

After the scanning is done, the AP and the STA may conduct an authentication and association procedure.

Figure 4:
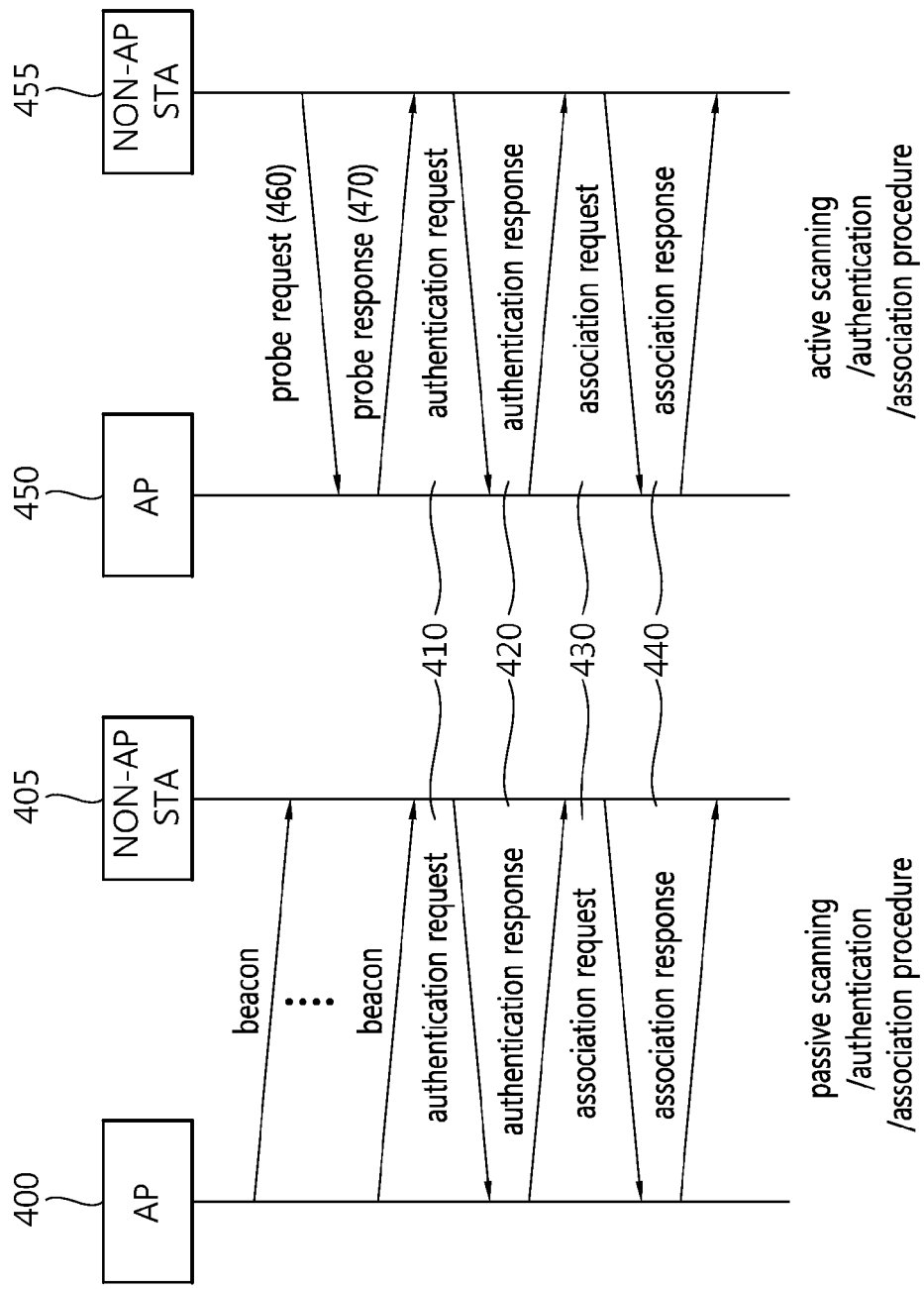
FIG. 4 is a concept view illustrating an authentication and association process after scanning between an AP and an STA.

FIG. 4 is a concept view illustrating an authentication and association process after scanning between an AP and an STA.

Referring to FIG. 4, after passive/active scanning, the authentication and association may be conducted with one of the scanned APs.

The authentication and association process may be carried out by way of, e.g., 2-way handshaking. A left part of FIG.

4 is a concept view illustrating an authentication and association process after passive scanning, and a right part of FIG. 4 is a concept view illustrating an authentication and association after active scanning.

The authentication and association process may be equally performed by exchanging an authentication request frame 410/authentication response frame 420 and an association request frame 430/association response frame 440 between the AP 400 or 450 and the non-AP STA 405 or 455 regardless of which one of the active scanning method and the passive scanning method has been used.

The authentication process may be conducted by transmitting the authentication request frame 410 from the non-AP STA 405 or 455 to the AP 400 or 450. In response to the authentication request frame 410, the authentication response frame 420 may be transmitted from the AP 400 or 450 to the non-AP STA 405 or 455. The authentication frame format is set forth in IEEE 802.11 Ch. 8.3.3.11.

The association process may be conducted by transmitting the association request frame 430 from the non-AP STA 405 or 455 to the AP 400 or 405. In response to the association request frame 430, the association response frame 440 may be transmitted from the AP 400 or 450 to the non-AP STA 405 or 455. The transmitted association request frame 430 contains information on the capability of the non-AP STA 405 or 455. Based on the information on the capability of the non-AP STA 405 or 455, the AP 400 or 450 may determine whether the non-AP STA 405 or 455 may be supported. In case such support is possible, the AP 400 or 450 may include in the association response frame 440 whether to accept the association request frame 430 and a reason therefore, and its supportable capability information, and the AP 400 or 450 may send the same to the non-AP STA 405 or 455. The association frame format is set forth in IEEE 802.11 Chs. 8.3.3.5/8.3.3.6.

After the association step is done, normal data transmission and reception is carried out. The association, unless done, is re-conducted based on the reason for which the association is not performed, or association with other AP may be performed.

Figure 5:
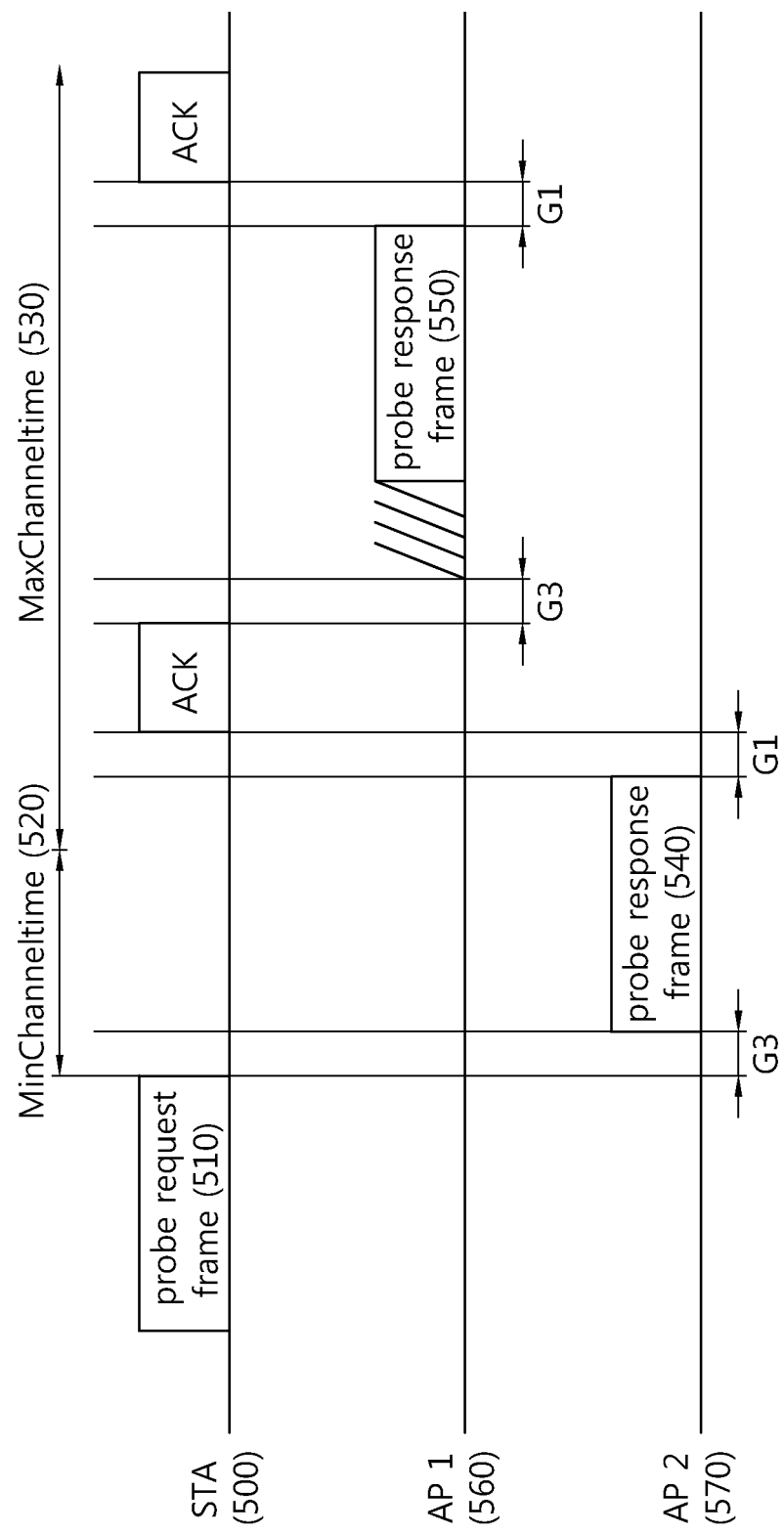
FIG. 5 is a concept view illustrating an active scanning procedure.

FIG. 5 is a concept view illustrating an active scanning procedure.

Referring to FIG. 5, the active scanning procedure may be performed in the following steps.

(1) It is determined whether the STA 500 is ready to perform the scanning procedure.

The STA 500 may wait, e.g., until the probe delay time expires or particular signaling information (for example, PHY-RXSTART.indication primitive) is received to perform active scanning.

The probe delay time is a delay that occurs before the STA 500 sends a probe request frame 510 when performing active scanning. PHY-RXSTART.indication primitive is a signal that is transmitted from the physical (PHY) layer to the local MAC (medium access control) layer. PHY-RXSTART.indication primitive may signal information indicating that the PLCP (physical layer convergence protocol) has received a PPDU (PLCP protocol data unit) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA 500 may transmit the probe request frame 510 to the APs 560 and 570 using a basic access method.

(3) Information for specifying the APs 560 and 570 included in MLME-SCAN.request primitive (for example, SSID (service set identification) and BSSID (basic service set identification) information) may be included in the probe request frame 510 and may be transmitted.

The BSSID may have a value corresponding to the MAC address of the AP as an indicator to specify the AP. The SSID (service set identification) is a network term for specifying an AP, which may be read by a person who operates the STA. The BSSID and/or SSID may be used to specify an AP.

The STA 500 may specify an AP based on the information to specify the APs 560 and 570 included by MLME-SCAN.request primitive. The specified APs 560 and 570 may send the probe response frames 540 and 550 to the STA 500.

The STA 500 may include the SSID and BSSID information in the probe request frame 510 and send the same, thereby unicasting, multicasting, or broadcasting the probe request frame 510. A method of unicasting, multicasting, or broadcasting the probe request frame 510 using the SSID and BSSID information is further described with reference to FIG. 6. For example, in case an SSID list is included in MLME-SCAN.request primitive, the STA 500 may include the SSID list in the probe request frame 510 and transmit the same. The APs 560 and 570 may receive the probe request frame 510, determine the SSIDs included in the SSID list contained in the received probe request frame 510, and determine whether to send the probe response frames 540 and 550 to the STA 500.

(4) A probe timer is initialized as 0 and is then operated.

The probe timer may be used to check a minimum channel time (MinChanneltime, 520) and a maximum channel time (MaxChanneltime, 530). The minimum channel time 520 and the maximum channel time 530 may be used to control the active scanning operation of the STA 500.

The minimum channel time 520 may be used to perform the operation for varying the channel for conducting active scanning. For example, in case the STA 500 fails to receive the probe response frames 540 and 550 until the minimum channel time 520, the STA 500 shifts scanning channels to perform scanning on other channel. In case the STA 500 receives the probe response frame 550 until the minimum channel time 520, it may process the received probe response frames 540 and 550 after waiting until the maximum channel time 530.

The STA 500 may detect PHY-CCA.indication primitive until the probe timer reaches the minimum channel time 520 and may determine whether other frame (for example, probe response frames 540 and 550) has been received by the STA 500 until before the minimum channel time 520.

PHY-CCA.indication primitive may transmit information on the state of the medium from the physical layer to the MAC layer. PHY-CCA.indication primitive may indicate the current state of the channel using channel state parameters such as "busy" when the channel is unavailable and "idle" when the channel is available. The STA 500 may determine that there are probe response frames 540 and 550 received by the STA 500 when PHY-CCA.indication is detected to be busy and may determine that there are no probe response frames 540 and 550 received by the STA 500 when PHY-CCA.indication is detected to be idle.

In case PHY-CCA.indication is detected to be idle, the STA 500 may set an NAV (net allocation vector) to 0, and the STA 500 may scan a next channel. In case PHY- CCA.indication is detected to be busy, the STA 500 may perform a process on the received probe response frames 540 and 550 after the probe timer reaches the maximum channel time 530. After the process on the received probe response frames 540 and 550 is done, the STA 500 may set the NAV (net allocation vector) to 0 and may then scan a next channel.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA 500 uses the active scanning method, the STA 500 should perform monitoring to determine whether the parameter of PHY-CCA.indication is busy until the probe timer reaches the minimum channel time.

The specific information included in the above-described MLME-SCAN is as follows. In order for the STA to perform scanning, the MLME may receive MLME-SCAN.request primitive. MLME-SCAN.request primitive is a primitive created by the SME. MLME-SCAN.request primitive may be used to determine whether there is other BSS to which the STA is to be connected.

MLME-SCAN.request primitive may contain information specifically such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo. The details of MLME-SCAN.request primitive are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications' 6.3.3.2 MLME-SCAN.request disclosed on November, 2011.

FIG. 6 is a concept view illustrating a probe request frame transmission method.

FIG. 6 discloses methods of broadcasting, multicasting, and unicasting probe request frames from an STA.

An upper part of FIG. 6 shows a method in which the STA 600 broadcasts the probe request frame 610.

The STA 600 may include a wildcard SSID and a wildcard BSSID in the probe request frame 610 and broadcast the probe request frame 610.

The wildcard SSID and the wildcard BSSID may be used as identifiers to indicate all of the APs 605-1, 605-2, 605-3, 605-4, and 605-6 included in the transmission range of the STA 600.

In case the STA 600 transmits the probe request frame 610 with the wildcard SSID and the wildcard BSSID included in the probe request frame 610, the APs 605-1, 605-2, 605-3, 605-4, and 605-6 that have received the probe request frame 610 from the STA 600 may send probe response frames to the STA 600 in response to the received probe request frame.

In case the APs 605-1, 605-2, 605-3, 605-4, and 605-6 that have received the broadcast probe request frame 610 send the probe response frames to the STA 600 in response to the received probe request frame 610 within a predetermined time, the problem may occur that the STA 600 should simultaneously receive and process too many probe response frames.

A middle part of FIG. 6 shows a method in which the STA 620 unicasts the probe request frame 630.

Referring to the middle part of FIG. 6, in case the STA 620 unicasts the probe request frame 630, the STA 620 may transmit the probe request frame 630 containing particular SSID/BSSID information of the AP. Among the APs that receive the probe request frame 630, only the AP 625 corresponding to the SSID/BSSID specified by the STA 620 may transmit a probe response frame to the STA 620.

A lower part of FIG. 6 shows a method in which the STA 640 multicasts the probe request frame 660.

Referring to the lower part of FIG. 6, the STA 640 may include an SSID list and a wildcard BSSID in the probe request frame 660 and transmit the same. Among the APs receiving the probe request frame 660, the APs 660-1 and 660-2 corresponding to the SSIDs included in the SSID list contained in the probe request frame may transmit a probe response frame to the STA 640.

As described above, the legacy STA may determine whether to unicast, multicast, or broadcast the probe request frame on the basis of the SSID and BSSID included in the MLME.SCAN-request primitive. The unicast, multicast, or broadcast of the probe request frame may be performed on the basis of the MLME.SCAN-request primitive as follows.

If the MLME.SCAN-request primitive includes a specific BSSID, the STA unicasts the probe request frame to an AP having the specific BSSID. An address field of a MAC header of the probe request frame to be unicast may include the specific BSSID of the AP.

If the MLME.SCAN-request primitive includes the SSID or an SSID list and includes a wildcard BSSID, the STA may multicast the probe request frame to an AP corresponding to the SSID or the SSID list. The probe request frame may include the SSID or the SSID list, and the address field of the MAC header of the probe request frame may include the wildcard BSSID.

If the MLME.SCAN-request primitive includes the wildcard SSID, the STA may broadcast the probe request frame. The probe request frame to be broadcast may include the wildcard SSID, and the address field of the MAC header may include the wildcard BSSID.

If the probe request frame is received from the STA, the AP may transmit a probe response frame in response to the probe request frame. In case of the legacy AP, the probe response frame is unicast in response to the probe request frame. However, if the AP is an FILS AP supporting an FILS, the probe response frame may be broadcast.

Figure 7:
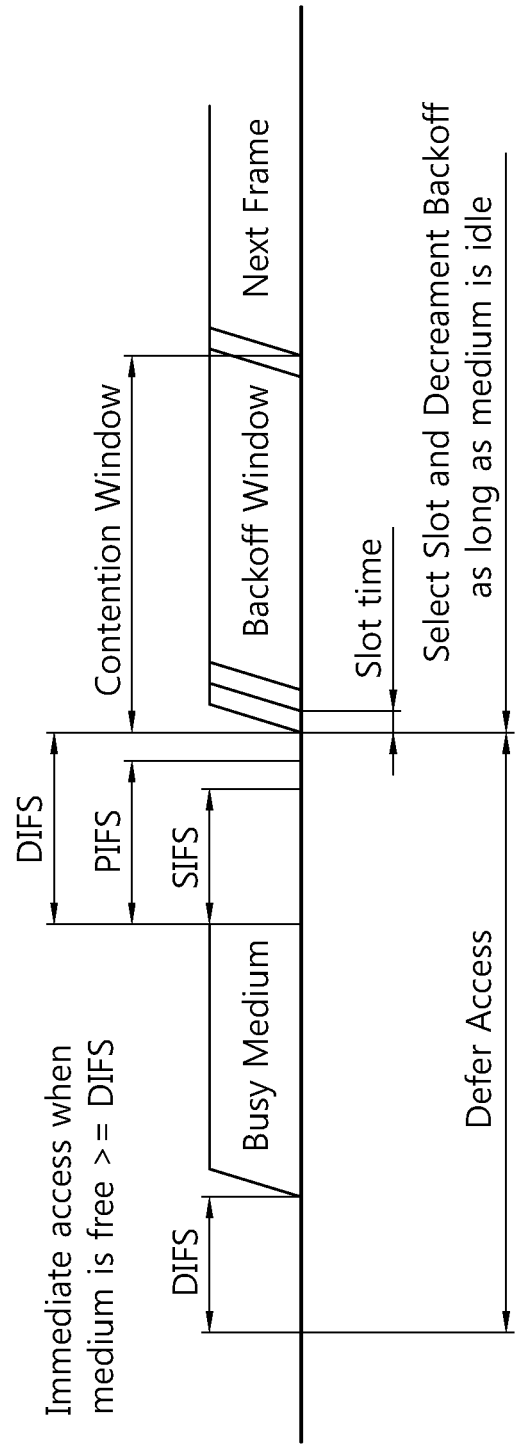
FIG. 7 shows the concept of a DCF-based channel access process.

FIG. 7 shows the concept of a DCF-based channel access process.

First, in the DCF-based channel access, an STA may determine whether to use a medium through a carrier sensing mechanism. If the medium is not in use longer than a DCF inter frame symbol (DIFS) duration (i.e., if a channel is idle), the STA may transmit a MAC protocol data unit (MPDU) of which transmission is imminent.

On the contrary, if the medium is in use during the DIFS duration (i.e., if the channel is busy), the STA may set a backoff time according to a random backoff algorithm.

The backoff time is a waiting time before transmitting a frame after the channel waits for a specific time (e.g., DIFS). The backoff time may be defined by the following equation.

$$BackoffTime = Random( ) \times aSlotTime \qquad <\text{Equation 1}>$$

Random( ) is a function of calculating a pseudo-random integer selected with uniform distribution in the interval of [0, CW]. CW may be selected from an integer greater than or equal to aCWMin less than or equal to aCWMax. aCWMin and aCWmax may be determined according to physical (PHY) characteristics. aSlotTime may be a time unit defined according to the PHY characteristics.

The STA may determine whether the channel is idle, and if the channel is idle, may decrease the backoff time in unit of SlotTime. Before the backoff time is decreased in unit of SlotTime, the STA may determine again whether the channel is idle for a duration corresponding to the DIFS. If the backoff time is 0, the STA may perform the channel access.

Figure 8:
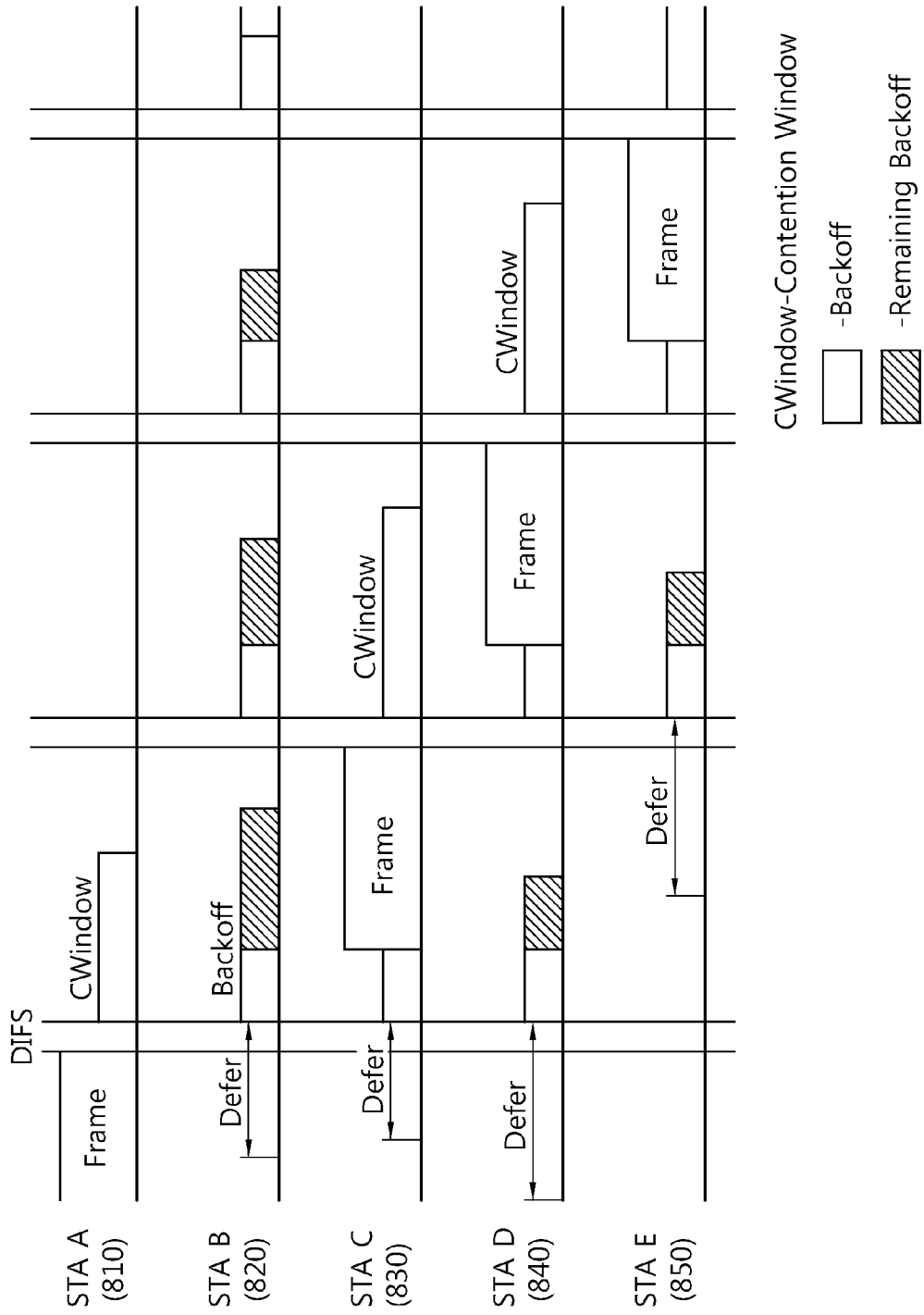
FIG. 8 shows the concept of a backoff procedure of a plurality of STAs.

FIG. 8 shows the concept of a backoff procedure of a plurality of STAs.

Referring to FIG. 8, a backoff time (or a size of a contention window (CW)) may be decreased after it is determined that a medium is idle for a DIFS duration. If an activity of the medium is not detected, the STA may decrease the backoff time in unit of SlotTime. If it is determined that the medium is in use during a backoff slot, the STA may defer the decrement of the backoff time. Frame transmission of the STA may start whenever a pre-set backoff timer reaches 0.

After frame transmission of an STA A 810, a backoff time which is set by each of an STA B 820, an STA C 830, and an STA D 840 may be decreased. Among the STA B 820, the STA C 830, and the STA D 840, the STA C 830 of which the backoff time is decreased to 0 most rapidly may transmit a frame through the medium. If the STA C 830 transmits the frame, the decrement of the backoff time of the STA B 820 and the STA D 840 may be deferred.

Further, the DCF transmission scheme includes an RTS/CTS access mode in which control frames (RTS, CTS) are exchanged before a data frame is transmitted to pre-occupy a channel. Such scheme may reduce channel waste by replacing a collision that may occur upon transmission of a data frame with a collision by a relatively short control frame.

As another method for sharing a radio medium by a plurality of STAs at the MAC layer, a PCF (Point Coordination Function) may be defined. The above-described DCF is based on the CSMA/CA scheme and is thus not able to guarantee real-time transmission of data transmitted between an STA and an AP. In contrast, the PCF may be used as a method for providing QoS (Quality Of Service) upon real-time data transmission. The PCF, also known as a non-contentious transmission service, may be used alternately with a DCF-type contention-based service, rather than exclusively using the entire medium transmission period. In the PCF, a point coordinator implemented in the AP of the BSS may control the right for each STA to be able to occupy the medium using a polling scheme. The PCF may be given a priority over the DCF by setting the PIFS, which is an IFS (Inter-Frame Space) in the PCF, to be smaller than the DIFS, which is an IFS of the DCF. The IFS denotes an interval between frames, and the IFS may be used to set a priority in which an STA accesses the medium. The IFS may be specifically defined as follows.

Figure 9:
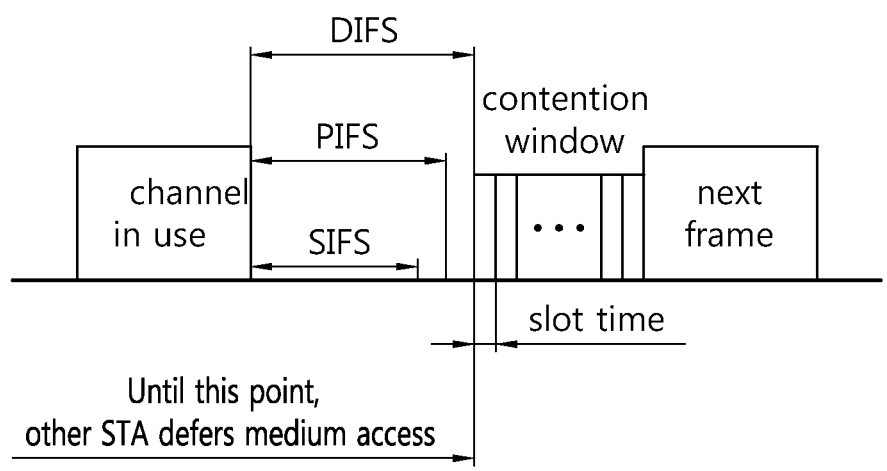
FIG. 9 is a concept view illustrating a frame interval.

FIG. 9 is a concept view illustrating a frame interval.

Referring to FIG. 9, the interval between two frames may be referred to as an inter frame space (IFS). An STA may determine whether a channel is being used for a time period of the IFS as defined in the standards, using a carrier sensing scheme. The MAC layer using the DCF defines a plurality of IFSs. The priority of an STA occupying a radio medium may be determined by an IFS. Inter-frame intervals depending on types of IFSs are as follow:

(1) SIFS (short inter frame symbol): It is used in RTS/CTS, ACK frame transmission. Top priority.

(2) PIFS (PCF IFS): It is used in frame transmission of an STA operating based on PCF.

(3) DIFS (DCF IFS): It is used in frame transmission of an STA operating based on DCF.

(4) EIFS (extended IFS): It is used only when an error occurs in frame transmission, and is not a fixed duration.

When DCF is used as a method of sharing a wireless medium by a plurality of STAs in a MAC layer, several problems may occur. For example, if the plurality of STAs simultaneously perform an initial access when using the DCF, frames transmitted by the plurality of STAs may collide. In addition, there is no concept on a transmission priority in the DCF. Therefore, quality of service (QoS) cannot be guaranteed as to traffic data transmitted by the STA. In order to solve such a problem, a hybrid coordination function (HCF) is defined in IEEE 802.11e as a new coordination function. As a channel access mechanism, the HCF defines an HCF controlled channel access (HCCA) and an enhanced distributed channel access (EDCA).

The EDCA may define access categories of traffic. A priority for performing a channel access may be determined on the basis of the access categories of traffic. That is, a CW size and an IFS size may be defined differently according to categories of traffic data transmitted by the STA. The different CW size and IFS size may determine a channel access priority depending on the categories of traffic data.

For example, if traffic data is an e-mail, the traffic data may be assigned to a low priority class for transmission. For another example, if the traffic data is voice communication through a wireless local area network (WLAN), the traffic data may be assigned to a high priority class for transmission.

Hereinafter, an EDCA-based channel access is described in detail.

In the EDCA-based channel access, an STA which transmits traffic data having a high priority may have more transmission opportunities than an STA which transmits traffic data having a low priority. In addition, on average, an STA which transmits high-priority traffic may have a shorter waiting time than an STA which transmits low-priority traffic before transmitting a packet. In order to implement such a method, a CW having a different size may be defined according to a priority of traffic data to be transmitted. In addition, an arbitration inter-frame space (AIFS) having a different size may be defined according to a priority of traffic data to be transmitted.

Concretely, in the EDCA-based channel access, traffic data may be divided into 8 types of user priorities. Each user priority may correspond to one access category (AC) among four ACs, i.e., AC_BK, AC_BE, AC_VI, AC_VO.

Table 1 is an exemplary table showing a mapping relation between the AC and the user priority of traffic data arrived to a MAC layer.

TABLE 1

| Priority | User priority | AC (access category) |
|---|---|---|
| Low | 1 | AC_BK |
|  | 2 | AC_BK |
|  | 0 | AC_BE |
|  | 3 | AC_BE |
|  | 4 | AC_VI |
|  | 5 | AC_VI |
|  | 6 | AC_VO |
| High | 7 | AC_VO |

Traffic data corresponding to a relatively high user priority may be preferentially transmitted on the basis of backoff parameters different from one AC to another. More specifically, in the EDCA-based channel access, a backoff procedure for transmitting a frame may be performed on the basis of AIFS[AC], CWmin[AC], and CWmax[AC] respectively, instead of the DCF-based parameters, i.e., DIFS, CWmin, and CWmax. That is, AIFS, CWmin, and CWmax may be set differently for each AC. When the AIFS[AC] and the CWmin[AC] have smaller values, a high priority is assigned. As a result, since a channel access delay becomes shorter, more bands may be used in a given traffic environment. A backoff parameter for each AC may be delivered to each STA through a beacon frame.

In addition, in the EDCA-based channel access, the STA may have access to a channel without competition during a transmit opportunity (TXOP) duration. During the TXOP duration determined within a range not exceeding a maximum duration of the TXOP, the STA may transmit as many packets as possible. If one frame is too long to be entirely transmitted during one TXOP duration, it may be transmitted by being split into small frames. The use of the TXOP may reduce a situation in which an STA having a low transfer rate excessively occupies a channel, which is a problem of the conventional 802.11 DCF MAC.

If many users of a specific location have access simultaneously through a WLAN, a channel access may be difficult.

If many STAs simultaneously have access to the channel, various problems may occur. The problems may be flooding of a probe request frame/probe response frame, a collision between STAs performing an initial access, a collision between the STA performing the initial access and an STA transmitting data, or the like.

For a detailed example, it may be assumed that many people perform a channel access in a stadium. In such a situation, many STAs may be hidden nodes to each other. In addition, if a plurality of STAs perform a channel access by selecting the same access parameter, there is a possibility of a collision of frames respectively transmitted by the plurality of STAs.

Therefore, in a high density region of an STA, such as the stadium, the STA may receive a frame of a different STA, and may determine whether an AP's response expected on the basis of the frame of the different STA is equal to an STA's response to be received from the AP. If the AP's response expected on the basis of the frame of the different STA is equal to the STA's response to be received from the AP, the STA may not transmit an additional frame to the AP. The STA may monitor the AP's response transmitted on the basis of the frame of the different STA. This method is used to omit unnecessary frame transmission and to reduce frame flooding.

For a detailed example, an STA may overhear a probe request frame transmitted by a different STA for an initial channel access. The STA may determine whether to transmit an additional probe request frame on the basis of the overheard probe request frame. That is, the STA needs to increase a probability of receiving (or overhearing) the probe request frame of the different STA when performing the initial access, in order to avoid flooding of the probe request frame and/or a collision between transmission frames.

Figure 10:
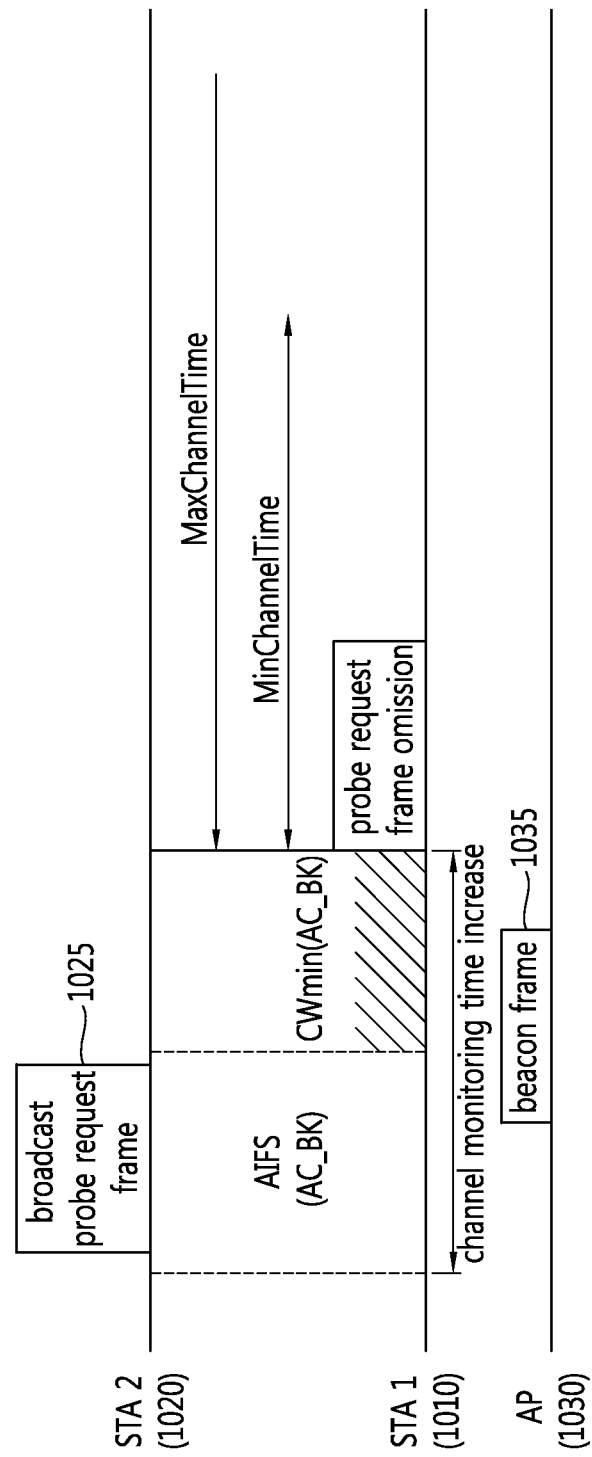
FIG. 10 shows the concept of a channel access for a probe request frame according to an embodiment of the present invention.

FIG. 10 shows the concept of a channel access for a probe request frame according to an embodiment of the present invention.

A case where an STA 1010 performs a channel access to broadcast the probe request frame is disclosed in FIG. 10.

According to the embodiment of the present invention, an access category (or a quality-of-service management frame (QMF) access category) of a probe request frame to be broadcast (hereinafter, a broadcast probe request frame) may be set to AC_BK, instead of AC_BE. If the access category of the broadcast probe request frame is set to AC_BK, a channel monitoring time of the STA 1010 before the broadcast of the probe request frame may be increased. Therefore, there may be an increase in a possibility that the STA 1010 receives a probe request frame 1025 from a different STA 1020 during the channel monitoring time or receives a beacon frame 1035, a fast initial link setup (FILS) discovery frame (not shown), and a probe response frame (not shown) from an AP 1030.

A backoff parameter may differ for each access category. Specifically, for example, if the access category is AC_BK, the backoff parameter may be AIFSN=9, CWmin=aCWmin. If the access category is AC_BE, the backoff parameter may be AIFSN=6, CWmin=aCWmin. If the access category is AC_VI, the backoff parameter may be AIFSN=3, CWmin=(aCWmin+1)/2−1. If the access category is AC_BK, the backoff parameter may be AIFSN=2, CWmin=(aCWmin+1)/4−1.

That is, according to the embodiment of the present invention, an access category corresponding to a lower priority than a default access category of a broadcast probe request frame may be set in the broadcast probe request frame. Therefore, there may be an increase in a channel monitoring duration before transmission of the broadcast probe request frame of the STA 1010. The increase in the channel monitoring duration may allow the STA 1010 to receive the probe request frame 1025, the beacon frame 1035, the FILS discovery frame, or the probe response frame at a higher probability during the channel monitoring duration.

The STA 1010 may determine whether the received probe request frame 1025, beacon frame 1035, FILS discovery frame, or probe response frame is a matched probe request frame, a matched beacon frame, a matched FILS discovery frame, or a matched probe response frame. Upon receiving the matched probe request frame, the matched beacon frame, the matched FILS frame, or the matched probe response frame, the STA 1010 may omit transmission of an additional broadcast probe request frame. Hereinafter, it is disclosed a method in which the STA 1010 determines the matched probe request frame, the matched beacon frame, the matched FILS frame, and the matched probe response frame.

The determination on the matched probe request frame may be performed as follows.

If a probe response frame to be received by an STA is a probe response frame to be transmitted in response to a probe request frame received from a different STA, the STA may determine a probe request frame received from the different STA as the matched probe request frame.

For example, if identification information (e.g., BSSID, SSID) of an AP intending to transmit a probe request frame is equal to identifier information of an AP transmitting a probe response frame in response to a probe request frame of the different STA, the STA may determine the probe request frame received from the different STA as the matched probe request frame. Alternatively, if the entirety or part of information to be included in the probe request frame to be transmitted by the STA is included in the probe request frame received from the different STA, the STA may determine the probe request frame received from the different STA as the matched probe request frame.

In addition thereto, if an initial access is possible on the basis of the probe response frame to be transmitted by the AP in response to the probe request frame received from the different STA, the STA may determine the probe request frame received from the different STA as the matched probe request frame. The STA may determine a probe request frame received by using other various criteria as the matched probe request frame.

The determination on the matched beacon frame may be performed as follows.

If a beacon frame received from an AP is a beacon frame to be received, an STA may determine the received beacon frame as the matched beacon frame.

For example, if identification information (e.g., BSSID, SSID) of an AP to which the STA intends to transmit a probe request frame is equal to identifier information of an AP transmitting a beacon frame, the STA may determine the beacon frame received from the AP as the matched beacon frame.

Alternatively, if an initial access is possible on the basis of the beacon frame received from the AP, the STA may determine the beacon frame received from the AP as the matched beacon frame. The STA may determine a beacon frame received by using other various criteria as the matched beacon frame.

The determination on the matched FILS discovery frame may be performed as follows.

If an FILS discovery frame received from an AP is an FILS discovery frame to be received, an STA may determine the received FILS discovery frame as the matched FILS discovery frame.

For example, if identification information (e.g., BSSID, SSID) of an AP to which the STA intends to transmit a probe request frame is equal to identifier information of an AP transmitting an FILS discovery frame, the STA may determine the FILS discovery frame received from the AP as the matched FILS discovery frame.

Alternatively, if an initial access is possible on the basis of the FILS discovery frame received from the AP, the STA may determine the FILS discovery frame received from the AP as the matched FILS discovery frame. The STA may determine an FILS discovery frame received by using other various criteria as the matched FILS discovery frame.

In addition thereto, if the probe response frame received from the AP is the probe response frame to be received, the STA may determine the received probe response frame as the matched probe response frame.

That is, according to the embodiment of the present invention, the STA may have an increased channel monitoring time before transmitting the probe request frame, and the STA may receive the matched probe request frame, the matched beacon frame, the matched FILS discovery frame, or the matched probe response frame at a high probability.

This method may be used to reduce flooding of the probe request frame in a high density region of the STA.

Figure 11:
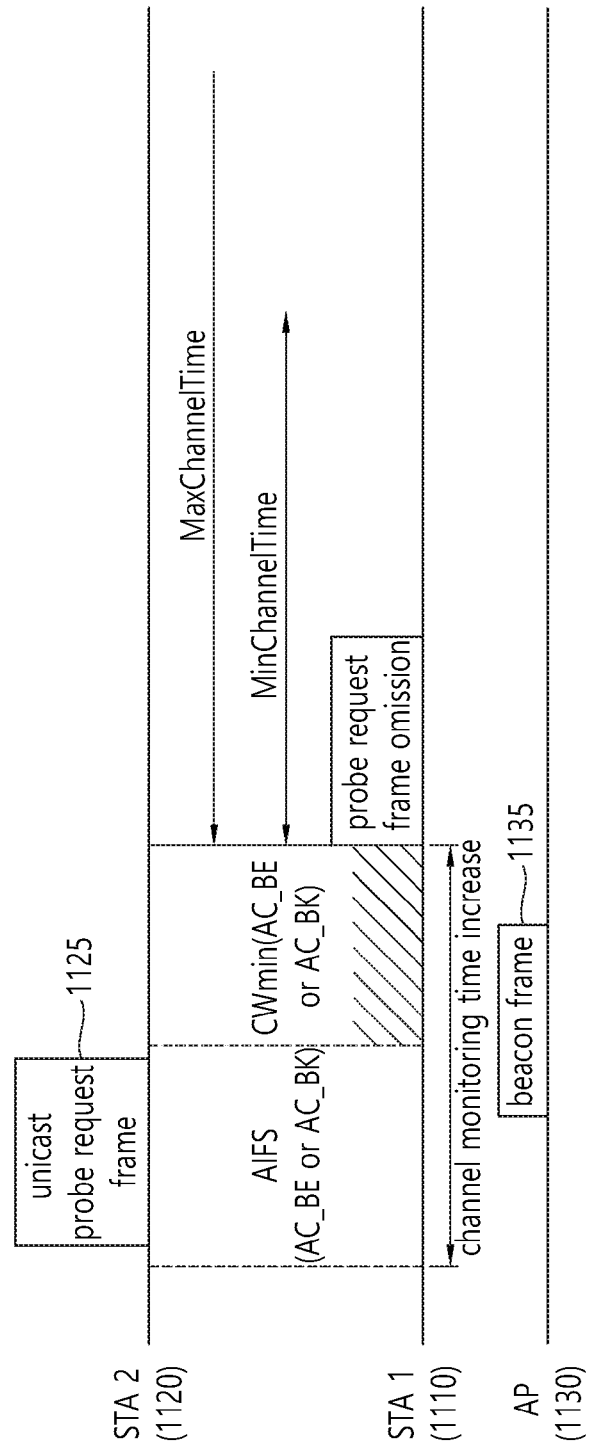
FIG. 11 shows the concept of a channel access for a probe request frame according to an embodiment of the present invention.

FIG. 11 shows the concept of a channel access for a probe request frame according to an embodiment of the present invention.

A case where an STA 1110 performs a channel access to unicast the probe request frame is disclosed in FIG. 11.

According to the embodiment of the present invention, an access category (or a QMF access category) of a probe request frame to be unicast (hereinafter, a unicast probe request frame) may be set to AC_BK, instead of AC_BE. If the access category of the unicast probe request frame is set to AC_BE or AC_BK instead of AC_VO, a channel monitoring time of the STA 1110 before the unicast of the probe request frame may be increased. Therefore, there may be an increase in a possibility of receiving a matched probe request frame 1125 from a different STA 1120 or receiving a matched beacon frame 1135, a matched fast initial link setup (FILS) discovery frame, or matched probe response frame from an AP 1130.

That is, an access category corresponding to a lower priority than a default access category of a unicast probe request frame may be set in the unicast probe request frame, and a channel monitoring duration of the STA 1110 may be increased. The increase in the channel monitoring duration may allow the STA 1110 to receive the probe request frame 1125, the beacon frame 1135, or the FILS discovery frame at a higher probability.

According to the embodiment of the present invention, frame flooding caused by an initial access and/or inter-frame collision can be solved by changing not only the access category of the probe request frame but also the access category of the probe response frame.

When an STA which performs active scanning rapidly in a high density region receives a matched probe response frame, the STA may not transmit an additional probe request frame to an AP. In the embodiment of the present invention, the access category of the probe response frame transmitted by the AP may be set to a higher priority than the access category of the probe request frame transmitted by the STA. Therefore, there may be an increase in a probability of receiving the probe response frame of the STA before the STA transmits the probe request frame.

If the QMF policy is not supported in the legacy AP, the access category of the probe response frame may be AC_VO, and if the QMF policy is supported in the legacy AP, the access category of the probe response frame may be AC_BE.

As described above, conventionally, AC_VO is an access category having a top priority. A backoff parameter of AC_VO may be AIFSN=2, CWmin=(aCWmin+1)/2−1).

In the embodiment of the present invention, an access category having a higher priority than AC_VO may be defined. Hereinafter, the access category having the higher priority than AC_VO is expressed by AC_INIT. AC_INIT may have a backoff parameter (e.g., AIFS (AC_INIT), CWmin (AC_INIT)) having a smaller size than the backoff parameter.

Figure 12:
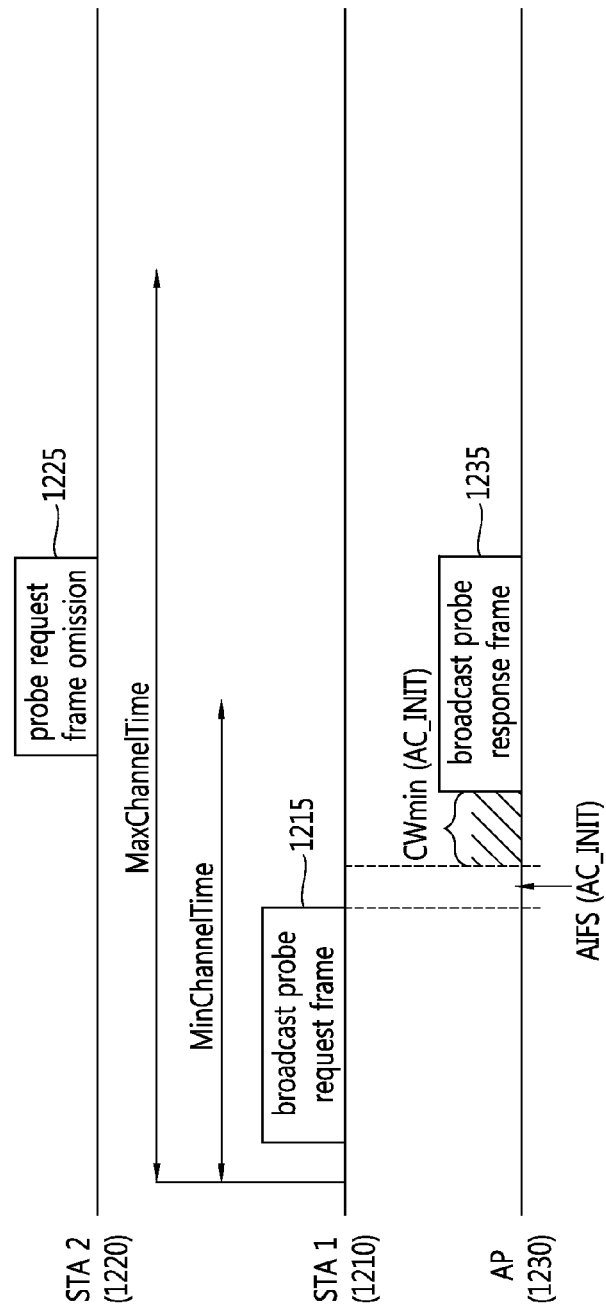
FIG. 12 shows the concept of a probe response frame transmission method according to an embodiment of the present invention.

FIG. 12 shows the concept of a probe response frame transmission method according to an embodiment of the present invention.

According to the embodiment of the present invention, an access category of the probe response frame may be set to have a higher priority than an access category of a probe request frame.

Referring to FIG. 12, a probe response frame 1235 uses a backoff parameter based on AC_INIT, and thus may occupy a medium more rapidly than a probe request frame transmitted by an STA 1220.

When using this method, an AP 1230 may transmit the probe response frame 1235 before the STA 1220 transmits a probe request frame 1225. Therefore, the STA 1220 may receive the probe response frame 1235 transmitted by an AP 1230, and may determine whether the received probe response frame 1235 is a matched probe response frame. If the received probe response frame 1235 is the matched probe response frame, the STA 1220 may omit transmission of the probe request frame 1225. If the probe request frame 1225 of the STA 1220 is omitted, flooding of the probe request frame may be reduced, and a collision possibility between the probe request frames may be reduced.

For another example, if the STA 1221 transmits the broadcast probe request frame 1225, an access category of the probe response frame 1235 may be set to AC_VO. The access category of the broadcast probe request frame 1225 may be AC_BE. In this case, if the access category of the probe response frame 1235 is AC_VO, the access category of the probe response frame 1235 has a relatively high priority. Therefore, the probe response frame 1235 may occupy a medium more rapidly than the probe request frame 1225 transmitted by the STA 1220. Therefore, the STA 1220 may receive the prose response frame 1235, and may determine whether the received frame is a matched probe response frame to omit transmission of the probe request frame 1225.

According to the embodiment of the present invention, the STA and the AP decide whether a current communication environment is a high density state, and may determine whether to change an access category. For example, the STA and the AP may determine whether the current communication environment is the high density state on the basis of a decision described below.

The STA may decide whether a channel is idle during a probe delay duration before transmitting the probe request frame. If the STA receives a probe request frame to be transmitted from a different STA during the probe delay duration, it may be determined that the current communication environment is the high density state. On the contrary, if the STA fails to receive the probe request frame to be transmitted from the different STA during the probe delay duration, it may be determined that the current communication environment is not the high density state. Alternatively, the STA fails to receive the probe request frame to be transmitted from the different STA during the probe delay duration, the STA may determine the current communication environment as a medium density state or a low density state.

If the AP receives a probe request frame greater than or equal to a threshold during a specific time duration, it may be determined that the current communication environment is the high density state. On the contrary, if the AP receives a probe request frame less than the threshold during the specific time duration, it may be determined that the current communication environment is not the high density state. Alternatively, if the AP receives a probe request frame less than the threshold during the specific time duration, it may be determined that the current communication environment is the medium density state or the low density state. The AP may perform a default configuration for a channel access by assuming the high density state, and may change the default configuration for the channel access depending on a communication environment.

According to the embodiment of the present invention, the STA may perform the following operation depending on a determined communication environment.

As described above with reference to FIG. 10 and FIG. 11, if the STA determines that the current communication environment is the high density state, the STA may change the access category of the probe request frame as an access category having a relatively low priority. As described above with reference to FIG. 10, if it is intended to transmit the broadcast probe request frame, the access category of the broadcast probe request frame may be changed from AC_VO to AC_BE or AC_BK. In addition, as described above with reference to FIG. 11, in case of the unicast probe request frame, the access category may be changed from AC_BE to AC_BK.

On the contrary, if the STA determines that the current communication environment is not the high density state, the STA may change the access category of the probe request frame to a category having a low priority.

In another method, if the STA determines that the current communication environment is the high density state, the STA may delay transmission of the probe request frame during a specific time duration (e.g., EIFS, MinChannelTime, etc.).

If the STA determines that the current communication environment is the high density state, the STA may transmit a frame for the access category (hereinafter, an access category frame) to an AP. The frame for the access category may be used to mandate a change of the access category of the AP or to deliver information on the change of the access category to the AP. The frame for the access category may be a QMF policy frame or a QMF policy change frame. For example, upon receiving the access category frame from the STA, the AP may change the access category to a configuration used in the high density state.

Alternatively, the STA may transmit an element for the access category (or an access category element) by including it into the frame. Likewise, the access category element may be used to mandate a change of the access category of the AP or to deliver information on the change of the access category to the AP. The access category element may be a QMF policy element.

According to the embodiment of the present invention, the AP may perform the following operation depending on a determined current communication environment.

As described above with reference to FIG. 12, if the AP determines that the current communication environment is the low density state, the AP may change the access category of the probe request frame. As described with reference to FIG. 12, the access category of the probe response frame may be changed to AC_INIT (if the QMF policy is not supported) or AC_VO (if the QMF policy is supported).

On the contrary, if the AP determines that the current communication environment is not the high density state, the AP may maintain the access category of the probe response frame to a default category (e.g., AC_VO (if the QMF policy is not supported), AC_BE (if the QMF policy is supported)), or may change the access category of the probe request frame to a category having a low priority (e.g., AC_BE (if the QMF policy is not supported), AC_BK (if the QMF policy is supported)).

If the AP determines the current communication environment as the high density state, the AP may transmit an element for the access category (hereinafter, an access category element) or a frame for the access category (hereinafter, an access category frame) to the STA.

The access category element or the access category frame may be used to mandate a change of the access category of the STA or to deliver information on the change of the access category to the STA. The access category element may be a QMF policy element. An unsolicited probe response frame, an FILS discovery frame, or a beacon frame may include the QMF policy information. For example, upon receiving the access category element from the AP, the STA may change the access category to an access category configuration used in the high density state.

Figure 13:
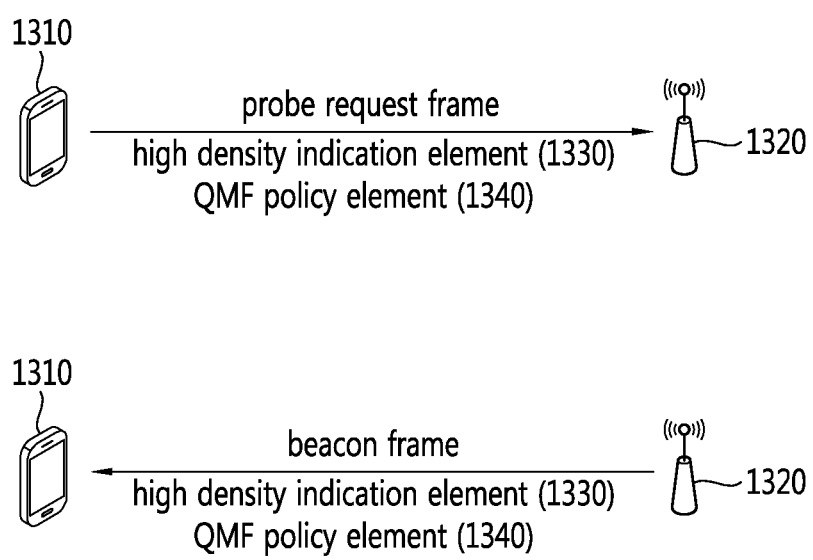
FIG. 13 shows the concept of an initial access method according to an embodiment of the present invention.

FIG. 13 shows the concept of an initial access method according to an embodiment of the present invention.

Referring to an upper side of FIG. 13, if a current communication situation is detected as a high density situation, an STA 1310 may transmit a probe request frame to an AP 1320 by including a high density indication element 1330. The high density indication element may include information on whether the current communication situation is the high density situation.

In addition, if the current communication situation is detected as the high density situation, the STA 1310 may transmit the probe request frame to the AP 1320 by including a QMF policy element 1340.

The QMF policy element 1340 may include information on an access category of a management frame (e.g., a probe request frame, an authentication request frame, an association request frame, etc.) to be transmitted by the STA 1310.

The AP 1320 may recognize a change in the access category of the management frame transmitted by the STA 1310 on the basis of information regarding a change in an access category and included in the QMF policy element 1340. Alternatively, the AP 1320 may change the access category of the management frame to be transmitted by the AP 1320 to an access category of a high density state on the basis of the information regarding the change in the access category and included in the QMF policy element 1340.

The high density indication element and the QMF policy element may also be transmitted from the AP to the STA.

Referring to a lower side of FIG. 13, if a current communication situation is detected as a high density situation, an AP 1320 may transmit a probe response frame, an FILS discovery frame, a short beacon frame, or a beacon frame to an STA 1310 by including a high density indication element 1330. For convenience of explanation, it is assumed that the frame to be transmitted by the AP 1320 is the probe response frame.

In addition, if the current communication environment is detected as the high density situation, the AP 1320 may transmit the probe request frame to the STA 1310 by including a QMF policy element 1340.

The QMF policy element 1340 may include information on the access category of the management frame (e.g., the probe response frame, the authentication response frame, the association request frame, etc.).

The STA 1310 may recognize a change of the management frame transmitted by the AP 1320 on the basis of information regarding a change in an access category and included in the QMF policy element 1340. Alternatively, the STA 1310 may change the access category of the management frame to be transmitted by the STA 1310 to an access category of a high density state on the basis of the information regarding the change in the access category and included in the QMF policy element 1340.

Figure 14:
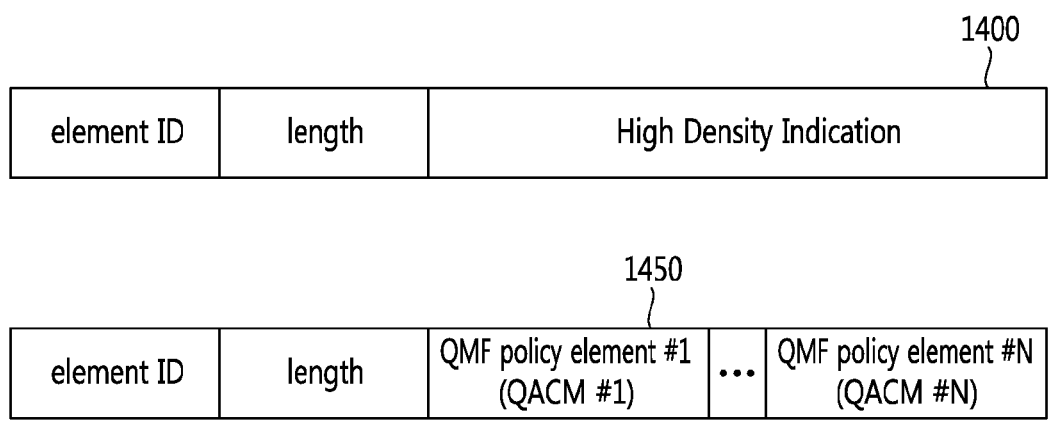
FIG. 14 shows the concept of a high density indication element and a QMF policy element according to an embodiment of the present invention.

FIG. 14 shows the concept of a high density indication element and a QMF policy element according to an embodiment of the present invention.

The high density indication element is shown in an upper side of FIG. 14.

A high density indication 1400 of a high density indication element may include information on a current communication state determined by an AP or an STA. For example, if the high density indication 1400 is 0, it may indicate that the current communication state is a non-high density state. If the high density indication 1400 is 1, it may indicate that the current communication state is a high density state.

The QMF policy element is shown in a lower side of FIG. 14.

A QMF policy element 1450 may include information on an access category determined by the AP or the STA. The QMF policy element 1450 may include indication information for indicating a changed access category. Each of the access categories may correspond to a specific bit, and a bit for the changed access category may be included in the QMF policy element 1450.

An access category of a management frame may be changed by transmitting an additional frame not only when an initial access is performed but also even after an initial access.

FIG. 15 shows the concept of an initial access method according to an embodiment of the present invention.

Referring to an upper side of FIG. 15, if a current communication situation is detected as a high density situation, an STA 1510 may transmit a QMF policy action frame 1530 or a QMF policy change action frame 1540 to an AP 1520. For convenience of explanation, it is assumed that the QMF policy action frame 1530 is transmitted.

A QMF policy element of the QMF policy action frame 1530 may include information on an access category of a management frame (e.g., an action frame, etc.) transmitted by the STA.

The AP 1520 may recognize a change in the access category of the management frame transmitted by the STA 1510 on the basis of information regarding a change in an access category and included in the QMF policy element of the QMF policy action frame 1530. Alternatively, the AP 1520 may change the access category of the AP 1520 to an access category of a high density state on the basis of the information regarding the change in the access category and included in the QMF policy element.

The QMF policy action frame may also be transmitted from the AP to the STA.

Referring to a lower side of FIG. 15, if a current communication situation is detected as a high density situation, the AP 1520 may transmit the QMF policy action frame 1530 or the QMF policy change action frame 1540 to the STA 1510. For convenience of explanation, it is assumed that the QMF policy action frame 1530 is transmitted.

The QMF policy action frame 1530 may include information on an access category of a management frame (e.g., an action frame, etc.) transmitted by the STA.

The STA 1510 may recognize a change in an access category of an action frame transmitted by the AP 1520 on the basis of information regarding a change in an access category and included in the QMF policy element. Alternatively, the STA 1510 may change the access category of the STA to an access category of a high density state.

Figure 16:
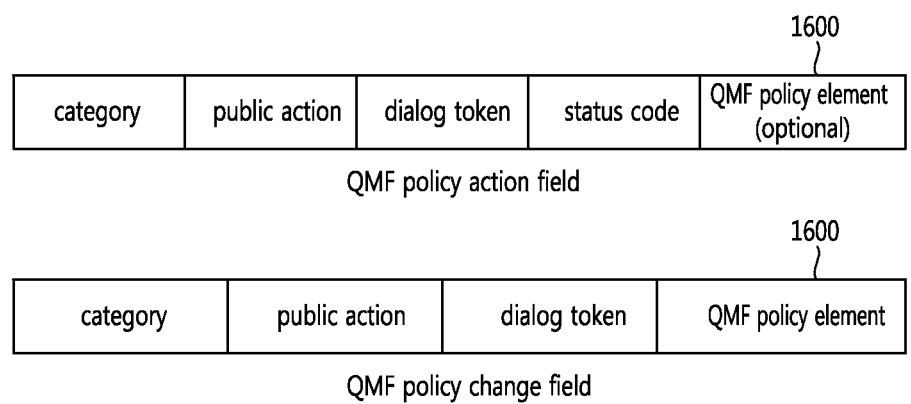
FIG. 16 shows the concept of a QMF policy action frame or a QMF policy change action frame according to an embodiment of the present invention.

FIG. 16 shows the concept of a QMF policy action frame or a QMF policy change action frame according to an embodiment of the present invention.

Referring to FIG. 16, a QMF policy change action field of the QMF policy action frame or a QMF policy change action field of the QMF policy change action frame may include a QMF policy element 1600.

As described above, the QMF policy element 1600 may include indication information for indicating a changed access category. Each of the access categories may correspond to a specific bit, and a bit for the changed access category may be included in the QMF policy element.

Figure 17:
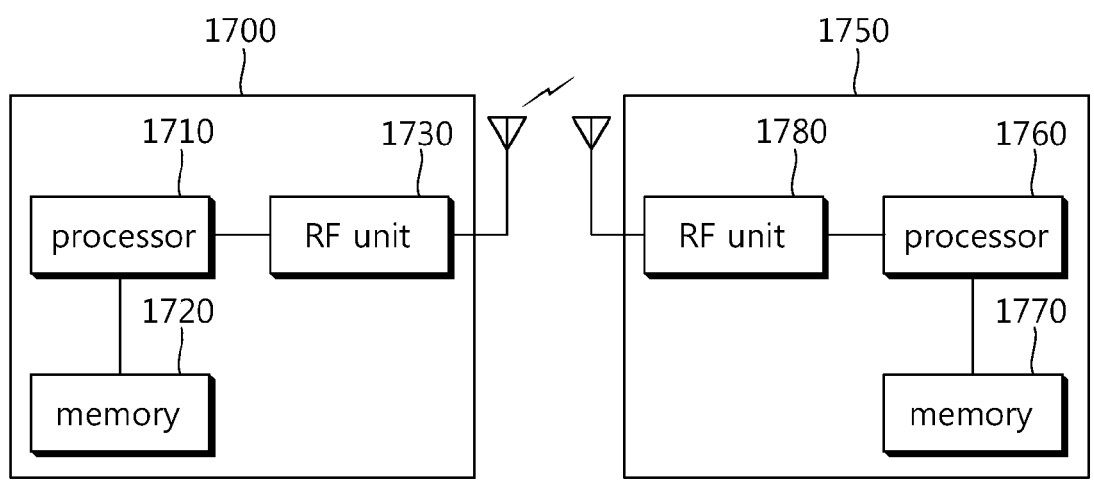
FIG. 17 is a block diagram illustrating a wireless device to which an embodiment of the present invention may apply.

FIG. 17 is a block diagram illustrating a wireless device to which an embodiment of the present invention may apply.

Referring to FIG. 17, the wireless device may be an STA that may implement the above-described embodiments, and the wireless device may be an AP 1700 or a non-AP STA (or STA)(1750).

The AP 1700 includes a processor 1710, a memory 1720, and an RF (Radio Frequency) unit 1730.

The RF unit 1730 may be connected with the processor 1710 to transmit/receive radio signals.

The processor 1710 implements functions, processes, and/or methods as proposed herein. For example, the processor 1710 may be implemented to perform the operation of the above-described wireless device according to an embodiment disclosed in FIG. 9 to FIG. 16 of the present invention.

For example, the processor 1720 may be implemented to receive information on a changed access category for a management frame from the STA. The processor 1720 may determine whether to change an AP's access category for the management frame on the basis of the changed access category received from the STA.

The non-AP STA 1750 includes a processor 1760, a memory 1770, and an RF (Radio Frequency) unit 1780.

The RF unit 1780 may be connected with the processor 1760 to transmit/receive radio signals.

The processor 1760 implements functions, processes, and/or methods as proposed herein. For example, the processor 1760 may be implemented to perform the operation of the above-described wireless device according to an embodiment disclosed in FIG. 6 to FIG. 16 of the present invention.

For example, the processor 1760 may be implemented to determine whether to change an access category for a probe request frame. The processor 1760 may be implemented to perform a backoff procedure for transmitting the probe request frame on the basis of a current access category if the current category is changed to another access category.

The processor 1710, 1720 may include an ASIC (Application-Specific Integrated Circuit), other chipset, a logic circuit, a data processing device, and/or a converter that performs conversion between a baseband signal and a radio signal. The memory 1720, 1770 may include a ROM (Read-Only Memory), a RAM (Random Access Memory), a flash memory, a memory card, a storage medium, and/or other storage device. The RF unit 1730, 1780 may include one or more antennas that transmit and/or receive radio signals.

When an embodiment is implemented in software, the above-described schemes may be embodied in modules (processes, or functions, etc.) performing the above-described functions. The modules may be stored in the memory 1720, 1770 and may be executed by the processor 1710, 1760. The memory 1720, 1770 may be positioned in or outside the processor 1710, 1760 and may be connected with the processor 1710, 1760 via various well-known means.

What is claimed is:

1. A channel access method in a wireless local area network (WLAN), the method comprising:
   determining whether a station (STA) changes a first access category for a first probe request frame based on whether a second probe request frame is received from another STA during a probe delay duration for the first probe request frame before a backoff procedure by the STA;
   if the second probe request frame is received during the probe delay duration, changing the first access category to a second access category,
   wherein the second access category has a lower priority than the first access category; and
   performing the backoff procedure by the STA to transmit the first probe request frame based on the second access category.

2. The channel access method of claim 1,
   wherein a size of a second arbitration inter-frame space (AIFS) of the second access category is greater than a size of a first AIFS of the first access category, and
   wherein a size of a second contention window minimum (aCWmin) of the second access category is greater than a size of a first aCWmin of the first access category.

3. The channel access method of claim 1, further comprising transmitting information on the second access category by the STA to an access point (AP).

4. The channel access method of claim 1, further comprising:
   if the second probe request frame is not received during the probe delay duration, changing the first access category to a second access category,
   wherein the second access category has a higher priority than the first access category; and
   performing the backoff procedure by the STA to transmit the first probe request frame based on the second access category.

5. A STA performing a channel access in a wireless local area network (WLAN), the STA comprising:
   a radio frequency (RF) unit configured to transmit a radio signal; and
   a processor operatively connected to the RF unit and configured to:
   determine whether a station (STA) changes a first access category for a first probe request frame based on whether a second probe request frame is received from another STA during a probe delay duration for the first probe request frame before a backoff procedure by the STA,
   if the second probe request frame is received during the probe delay duration, change the first access category to a second access category,
   wherein the second access category has a lower priority than the first access category, and
   perform the backoff procedure by the STA to transmit the first probe request frame based on the second access category.

6. The STA of claim 5,
   wherein a size of a second arbitration inter-frame space (AIFS) of the second access category is greater than a size of a first AIFS of the first access category, and
   wherein a size of a second contention window minimum (aCWmin) of the second access category is greater than a size of a first aCWmin of the first access category.

7. The STA of claim 5,
   wherein the processor is further configured to transmit information on the second access category by the STA to an access point (AP).

8. The STA of claim 5, wherein the processor is further configured to:
   change the first access category to the second access category if the second probe request frame is not received during the probe delay duration,
   wherein the second access category has a higher priority than the first access category; and
   perform the backoff procedure by the STA to transmit the first probe request frame based on the second access category.

* * * * *